United States Patent [19]

Cheal et al.

[11] Patent Number: 4,697,184
[45] Date of Patent: Sep. 29, 1987

[54] INTRUSION DETECTION RADAR SYSTEM WITH AMPLITUDE AND FREQUENCY CARRIER MODULATION TO ELIMINATE TARGETS AT SHORT AND LONG RANGES

[75] Inventors: James Cheal; James R. Fitzsimmons; Edward J. Foley, all of Tempe, Ariz.

[73] Assignee: Southwest Microwave, Tempe, Ariz.

[21] Appl. No.: 578,539

[22] Filed: Feb. 9, 1984

[51] Int. Cl.$^4$ .................. G01S 13/56; G01S 13/38; G08B 13/24
[52] U.S. Cl. .................................. 342/28; 342/129; 340/554
[58] Field of Search .................. 343/5 PD, 7.7, 12 R, 343/14, 17.5; 340/554; 367/93, 94; 342/28, 129

[56] References Cited

U.S. PATENT DOCUMENTS

| | | | |
|---|---|---|---|
| 3,697,985 | 10/1972 | Faris et al. | 343/5 PD |
| 3,766,554 | 10/1973 | Tresselt | 343/14 |
| 3,832,709 | 8/1974 | Klein et al. | 343/5 PD |
| 3,932,871 | 1/1976 | Foote | 343/5 PD |
| 4,527,151 | 7/1985 | Byrne | 343/7.7 X |

OTHER PUBLICATIONS

"Modulation Schemes in Low-Cost Microwave Field Sensors", Jefford and Howes, IEEE Transactions on Microwave Theory and Techniques, vol. MTT-31, No. 8, Aug. 1983, pp. 613–623.
"Microprocessor Target Assessment for Microwave Intruder Alarms", Monds et al., 1982 Carnahan Conference on Security Technology, May 12–14, 1982.

Primary Examiner—T. H. Tubbesing
Assistant Examiner—Gilberto Barrón, Jr.
Attorney, Agent, or Firm—Cahill, Sutton & Thomas

[57] ABSTRACT

An outdoor microwave transceiver area intrusion detection system includes circuitry for both amplitude and frequency modulation of the microwave carrier signal pulses, which are transmitted at approximately a 50% duty cycle pulses, from a radar antenna to a target. The return signal is mixed with a portion of the transmitted signal to produce first and second doppler frequency signals which are amplified and sampled during a narrow gating pulse. The two resulting sampled doppler frequency signals are alternately switched, in synchronization with the amplitude and frequency modulation signals, into first and second sample/hold circuits to reconstruct the first and second doppler frequency signals. The reconstructed signals are coupled to a differential amplifier to obtain a "range signal" which is proportional to the phase difference between the first and second doppler signals. The range signal is amplified and used to set an alarm circuit if its amplitude exceeds a certain threshold level for a certain interval of time. Signals from "close in" targets, due to rain on the radome surface and the like, are eliminated by the low value of the range signal. Signals from distant targets are cut off by the narrow gating pulse.

24 Claims, 6 Drawing Figures

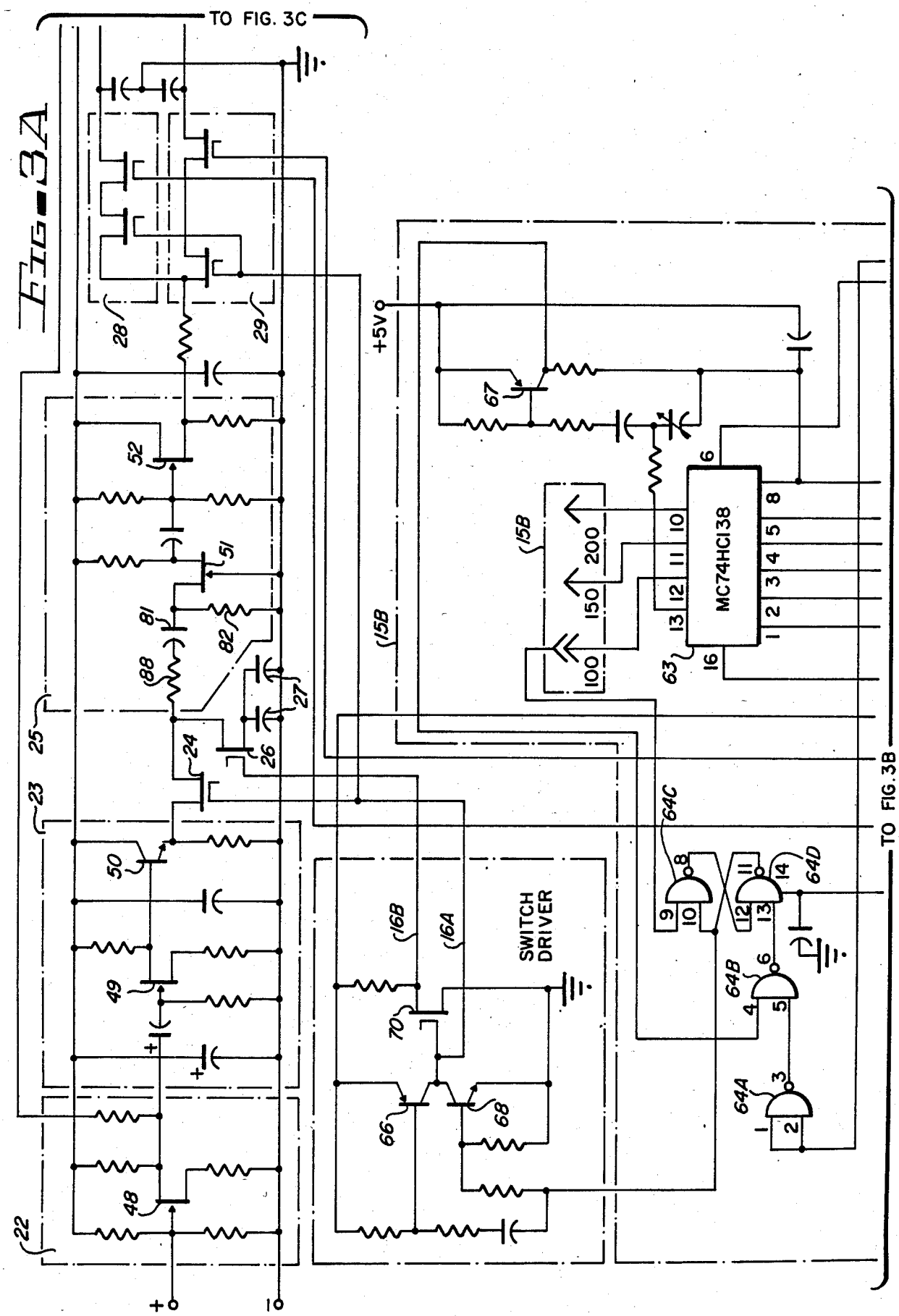

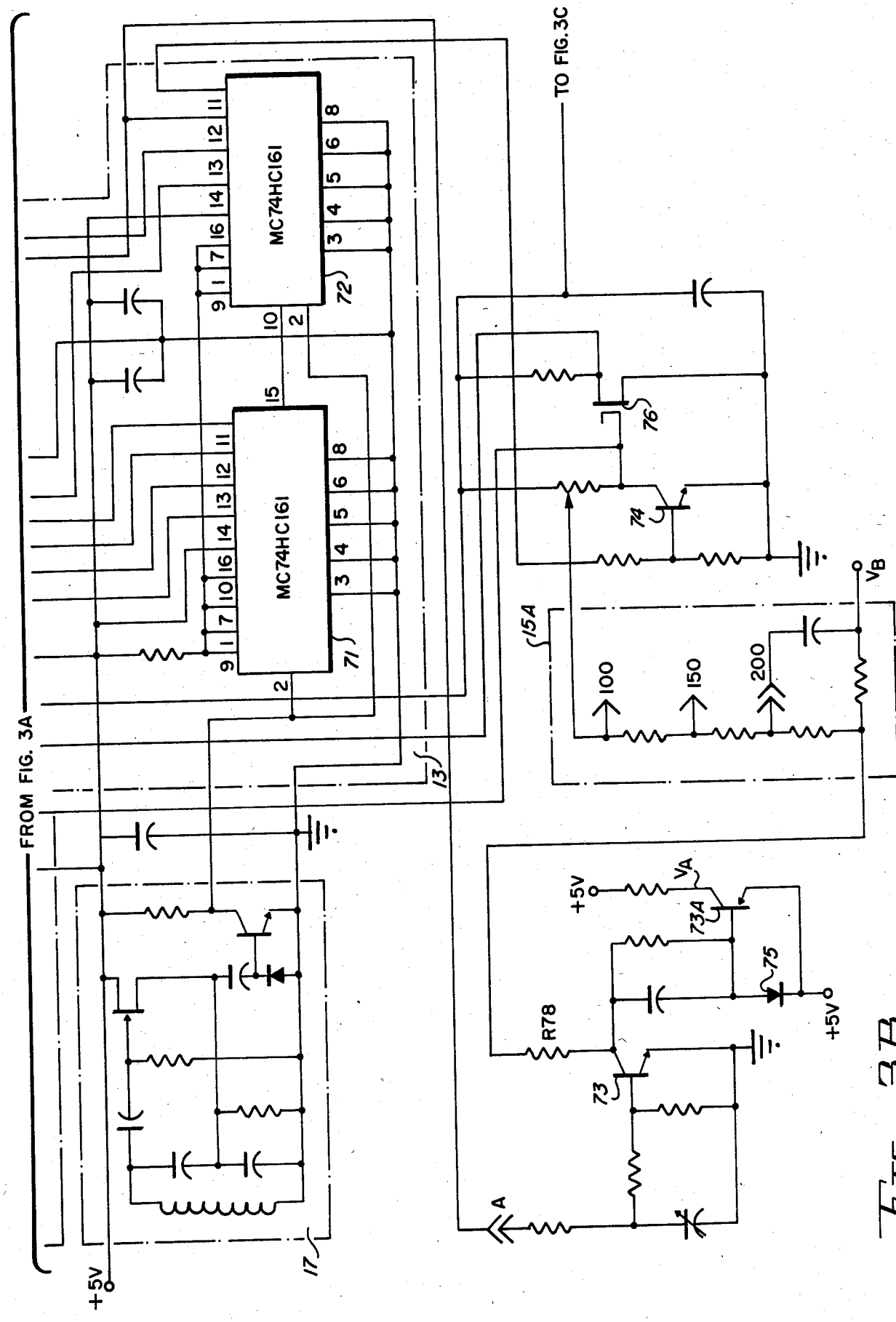

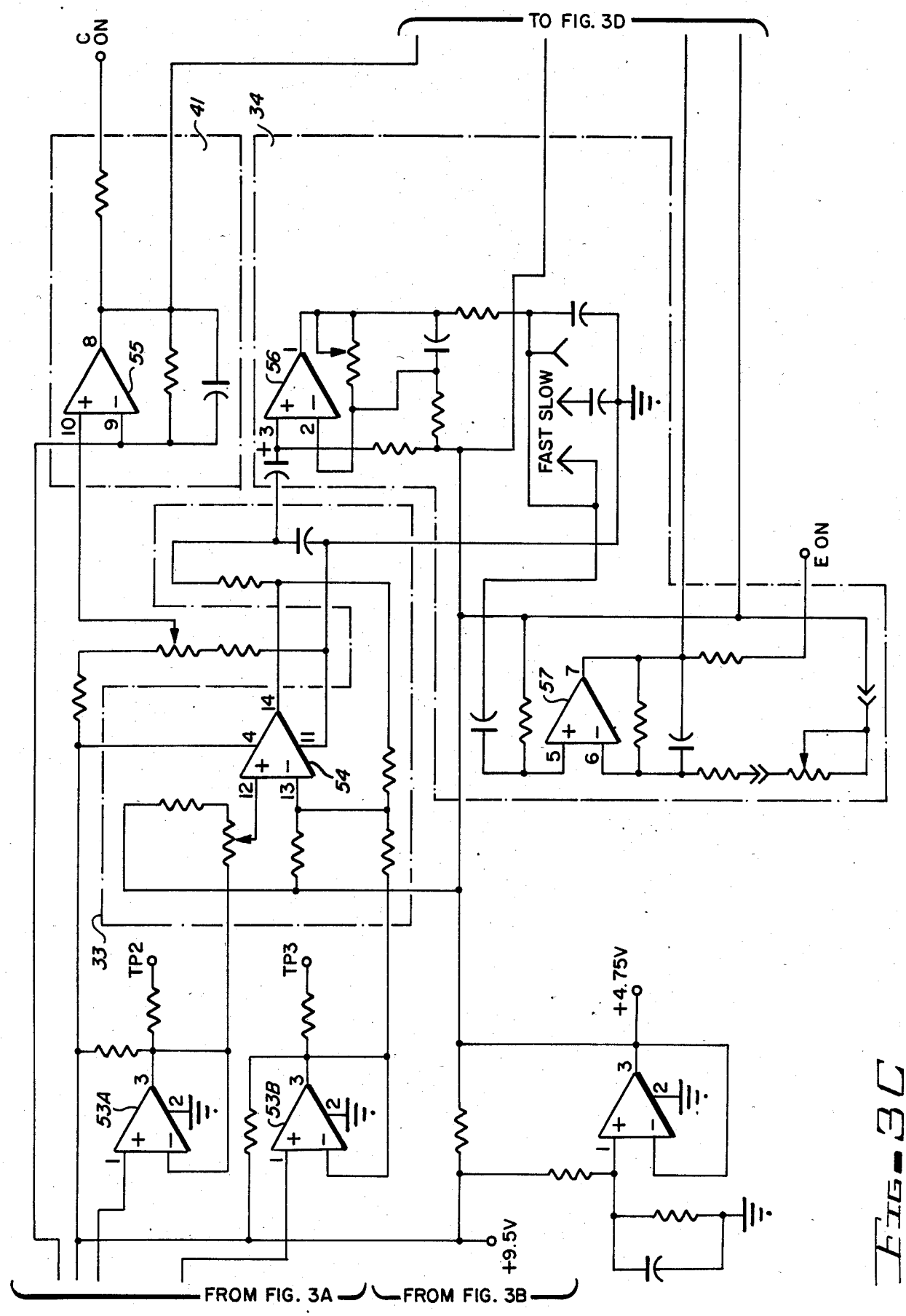

INTRUSION DETECTION RADAR SYSTEM WITH AMPLITUDE AND FREQUENCY CARRIER MODULATION TO ELIMINATE TARGETS AT SHORT AND LONG RANGES

BACKGROUND OF THE INVENTION

The invention relates to radar area intrusion detection systems, and more particularly to radar intrusion detection systems which are capable of avoiding false alarms due to close-in targets, such as rain on the face of the radome, microphonic vibration of the radome, or small windblown articles.

Area intrusion detection devices are commonly used for protection of fenced outdoor regions and the like where equipment is protected or stored. Various microwave area intrusion protection devices are known. For example, see U.S. Pat. No. 4,328,487, issued May 4, 1982 and assigned to the present assignee.

Various modulation schemes have been used in low cost microwave short range surveillance systems. The state of the art is reviewed in "Modulation Schemes in Low-Cost Microwave Field Sensors" by Peter A. Jefford and Michael J. Howes, IEEE Transactions on Microwave Theory and Techniques, Vol. MTT-31, No. 8, August, 1983. Also see the paper "Microprocessor Target Assessment for Microwave Intruder Alarms" by Fabian Monds, Caesar Stewart, and Robert Kane, presented at the University of Kentucky, Lexington, Ky., May 12–14, 1982.

Present area instrusion detection microwave systems all have the shortcoming that they are unable to distinguish between small, very "close in" targets, such as raindrops on the face of a radome in front of the transmitting antenna, "microphonic" vibration on the surface of the radome in front of the antenna, and small windblown articles that pass immediately in front of the radome from larger, more distant targets, such as a burglar moving through the protected area at a distance of several hundred feet. Present area intrusion detection microwave systems also are incapable of distinguishing the burglar from large, distant moving targets, such as a large truck a thousand or more feet distant. As a result, the present area intrusion protection systems generate a sometimes unacceptably large number of false alarms due to the reflections or signals that are generated by the above-mentioned unintended targets. One of the main radar systems available is the continuous wave type, in which a carrier is continuously transmitted by the antenna to a target and the reflected return signal is mixed with a portion of the transmitted signals to produce a "doppler signal" which has a DC level produced in response to return signals from stationery targets and a time-varying level produced in response to return signals from moving targets. This technique has the difficulty of being sensitive both to (1) small close-in targets, such as raindrops on the surface of the radome, or vibration of the radome surface, and (2) very large, distant targets. Even though "umbrellas" or shields have been devised to prevent raindrops from accumulating on and running down the face of the radome in front of the antenna and producing reflections that trigger false alarms, these rain shields do not solve the problem in the presence of high winds which blow rain underneath the shiels onto the face of the radome.

Pulsed radar systems have been used for many years. Pulsed radar systems having "range gates" which "cut off" targets beyond a certain range have been utilized. However, all known pulsed radar systems have utilized very narrow transmitted "pulses" or bursts of the microwave carrier signal. The use of such narrow pulses or bursts provides a straight forward method of range discrimination, but has the shortcoming that the narrow pulses or bursts generate many side band frequencies in prohibited parts of the electromagnetic spectrum. Federal Communications (FCC) regulations permit such side band emissions in certain military and civilian applications, but Part 15, Subpart F of the FCC reguations restricts the bandwidth for area (or volumetric) intrusion detection radar systems. Therefore, use narrow pulsed radar systems has not heretofore been used in intrusion protection systems to which the present invention is directed.

Presently, there is no proposed technique for avoiding both the above-mentioned reflections from either very near, small, close in targets such as raindrops and very large, distant targets in the field of intrusion radar protection systems. Consequently, and where possible, users have simply "lived with" such reflections and the occasional false alarms caused thereby. The unavailability of a solution to this problem has limited the market for this type of radar intrusion detection system, especially in areas where false alarms are highly intolerable.

Therefore, it is clear that there is an unmet need for a low cost radar area or volumetric intrusion detection system which avoids false alarms set off by reflections produced by very large, distant moving targets or by very small, close targets, such as small wind-blown articles, raindrops on the face of the radome, and/or vibration of the surface of the radome.

Therefore, it is an object of the invention to provide a microwave intrusion detection system which avoids reflections or signals produced by small close-in targets.

It is another object of the invention to provide a low cost microwave intrusion detection system which avoids reflections or signals resulting from very small, close-in targets, including rain on the face of the radome and/or vibration of the radome without producing unacceptable spurious radiation outside of the portion of the spectrum allocated by FCC regulations.

It is another object of the invention to provide a microwave intrusion detection system which avoids reflections or false alarm signals caused by both very small, close-in targets and/or very large, distant targets.

SUMMARY OF THE INVENTION

Briefly described, and in accordance with one embodiment thereof, the invention provides a microwave intrusion detection system in which alternating first and second frequency portions of a microwave signal are transmitted from an antenna enclosed in a radome into a protective region, reflected by a target back to the antenna, detected to produce first and second doppler signals having a phase difference that is proportional to the range of the target, measuring the phase difference in order to produce a phase difference signal, and producing an alarm signal in response to the phase difference signal if the phase difference signal exceeds a certain magnitude for at least a certain duration. In the described embodiment of the invention, the first and second frequency portions of the microwave signal are separated into pulses or "bursts" of the first and second frequencies, respectively. The output of a detector is amplified by means of first amplifying circuitry. The output of the first amplifying circuitry is switched in synchronization with the pulses of the microwave frequency in response to a range or gating signal applied to the gate electrode of a high frequency field effect transistor in order to reject any portions of the doppler signals due to reflection from a target beyond a certain cutoff range. The output of a successive amplifying stage is alternately switched, in synchronization with the pulses of the first and second frequencies, respectively, into first and second sample/hold capacitors to effectively reconstruct replicas of the first and second doppler signals. The voltages on the sample/hold capacitors are applied to the inputs of a differential amplifier, which produces an output signal representative of the difference in phase between the first and second doppler signals. This phase difference signal is amplified and fed into a threshold detector circuit which produces an output signal if the phase difference exceeds a certain magnitude. The output signal of the threshold detector circuit is fed into an integrating circuit which produces an alarm signal if the output of the threshold detector is present for at least a predetermined time in order to prevent very short duration signals from setting off false alarms. The average voltage level from the detector circuit is amplified and fed into an overload detector circuit to cause an alarm signal to be produced if a microwave signal reflecting cover is placed over the radome. The described embodiment of the invention eliminates reflected signals from large distant targets beyond the certain cutoff range, and also eliminates reflected signals due to small, close in targets, such as rain on the face of the radome or microphonic vibration of the radome and also prevents disabling of the system by placing a very large target very close to the antenna.

BRIEF DESCRIPTION OF THE DRAWINGS

FIGS. 3A–3D constitute a schematic diagram showing in detail the circuitry shown in FIG. 1.

DESCRIPTION OF THE INVENTION

Figure 1:
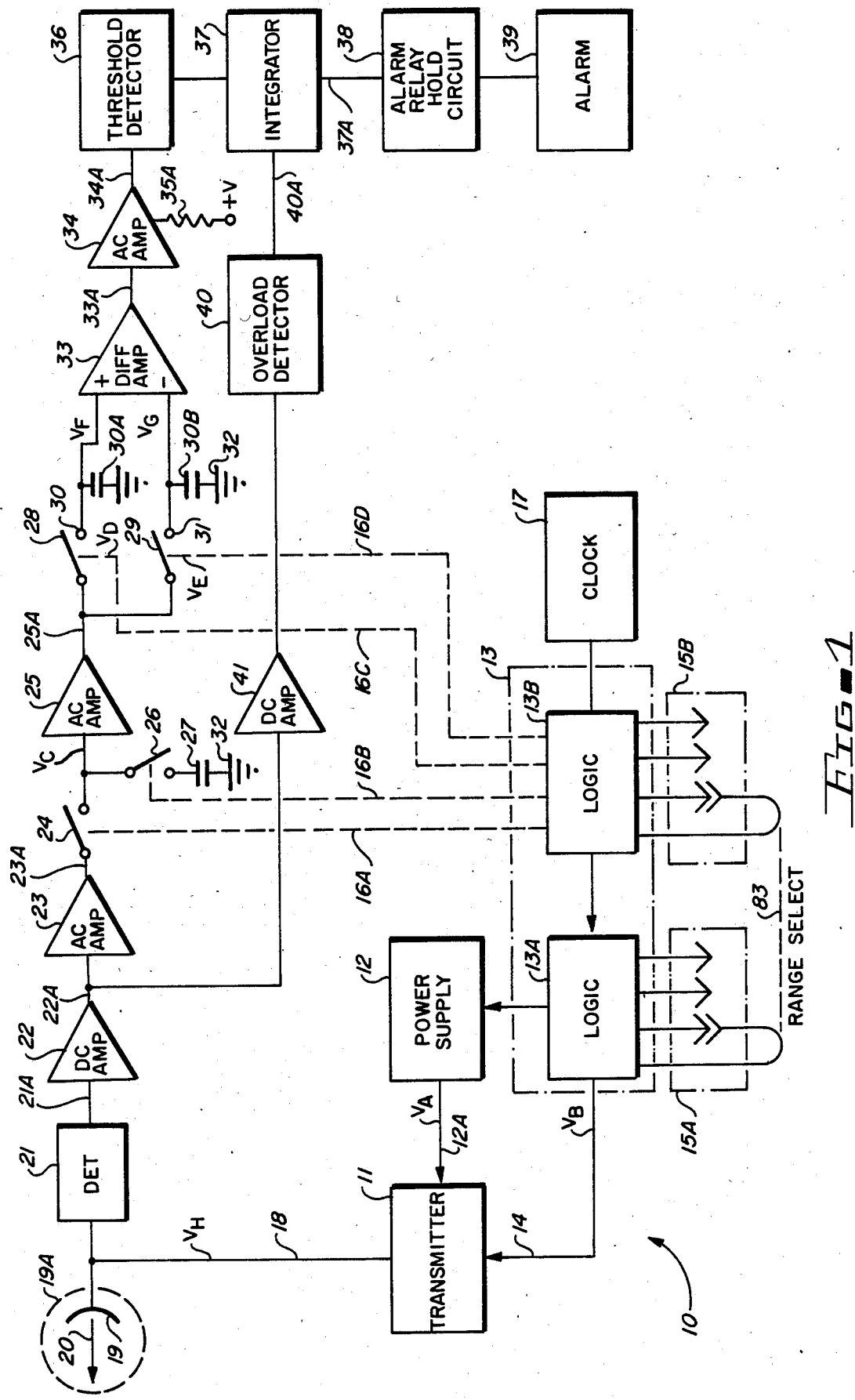
FIG. 1 is a block diagram of the radar intrusion detection system of the present invention.

Referring now to FIG. 1, reference numeral 10 designates a microwave "volumetric intrusion detection system", referred to hereinafter simply as transceiver 10, and sometimes also referred to as an area intrusion detection system.

Transceiver 10 includes a transmitter 11, subsequently described. A switchable power supply 12 is connected by conductor 12A to transmitter 11. Block 13 includes logic circuitry 13A which produces an output signal on conductor 14, that controls a varactor tuning circuit contained in transmitter 11, causing its frequency to vary between two frequencies $f_1$ and $f_2$ in response to the voltage $V_B$ shown in FIG. 2. Reference numerals 15A and 15B designate switches that can be set to select the frequency at which power supply 12 is switched and the values of the two frequencies $f_1$ and $f_2$ produced by transmitter 11.

Block 13 also includes logic circuitry 13B which includes circuitry for generating signals represented by dotted lines 16A and 16B, which control switching of two switches 24 and 26 (which are implemented by means of high speed metal oxide field effect transistors (MOSFETs), subsequently described) to control the maximum range at which targets are detected in the region protected by the transceiver 10. Dotted lines 16C and 16D represent signals produced by logic circuit 13B to control the switching of two more switches 28 and 29, (which also are implemented by means of two high speed field effect transistors).

Reference numeral 17 designates a clock circuit that produces the basic frequency from which amplitude modulation signals and frequency modulation signals on conductors 12A and 14 are derived. Switch 15B controls the timing of the gating pulses of the signals represented by dotted lines 16A, 16B, 16C and 16D.

Transmitter 11 produces an amplitude modulated, (i.e., pulsed) frequency modulated signal on conductor 18, which is connected to antenna 19. Antenna 19 is enclosed in a protective radome 19A. Reference numeral 20 designates the transmitted radar signal. Conductor 18 is also connected to the input of a conventional microwave detector designated by reference numeral 21. The output of detector 21 is a doppler signal having frequencies of $f_{1d}$ and $f_{2d}$, and is applied by means of conductor 21A to the input of DC amplifier 22. The doppler signal produced on conductor 21A is thereby amplified by amplifier 22 and then further amplified by AC amplifier 23. The output of AC amplifier 23 is produced on conductor 23A, which is connected to one of the current-carrying source electrodes of a field effect transistor represented by switch 24. The gate of field effect transistor 24 is controlled by the signal represented by dotted line 16A. The other current carrying terminal, i.e., the drain electrode of field effect transistor 24, is connected to the input of AC amplifier 25. The input of amplifier 25 is also connected to field effect transistor 26. The drain electrode of field effect transistor 26 is connected to an "auto-zero" capacitor 27. The gate of the field effect transistor represented by switch 26 is connected to a conductor represented by dotted line 16B. Its function is explained subsequently.

The output of AC amplifier 25 is connected to conductor 25A. Conductor 25A is connected to the source electrodes of two field effect transistor switches 28 and 29, schematically shown in FIG. 1. The gate electrodes of these two field effect transistors are coupled to the signals represented by dotted lines 16C and 16D, respectively. The drain electrodes of field effect transistor switches 28 and 29 are connected to conductors 30 and 31, respectively and also to sample/hold capacitors 30A and 30B, respectively. The other terminal of each of capacitors 30A and 30B is connected to ground conductor 32. As subsequently explained, "reconstructed" doppler signals having first and second frequencies are produced on conductors 30 and 31 as a result of the signal sampling operation of field effect transistors 28 and 29, respectively. These two reconstructed signals are applied to the positive and negative inputs, respectively, of differential amplifier 33. The output of differential amplfier 33 is coupled by means of conductor 33A to the input of AC amplifier 34, the sensitivity of which is adjustable by a variable resistor 35. The output of AC amplifier 34 is connected by means of conductor 34A to the input of a threshold circuit 36. The output of threshold circuit 36 is connected to one input of an integrating circuit 37. The output of integrator 37 is connected by means of conductor 37A to an input of alarm relay hold circuit 38, the output of which actuates the power relay of an alarm device 39.

A second input of integrator 37 is connected to the output 40A of an overload detector circuit 40. The input of overload detector circuit 40 is connected to the output of a DC amplifier 41, the input of which is connected to the output conductor 22A of DC amplifier 22.

Figure 2:
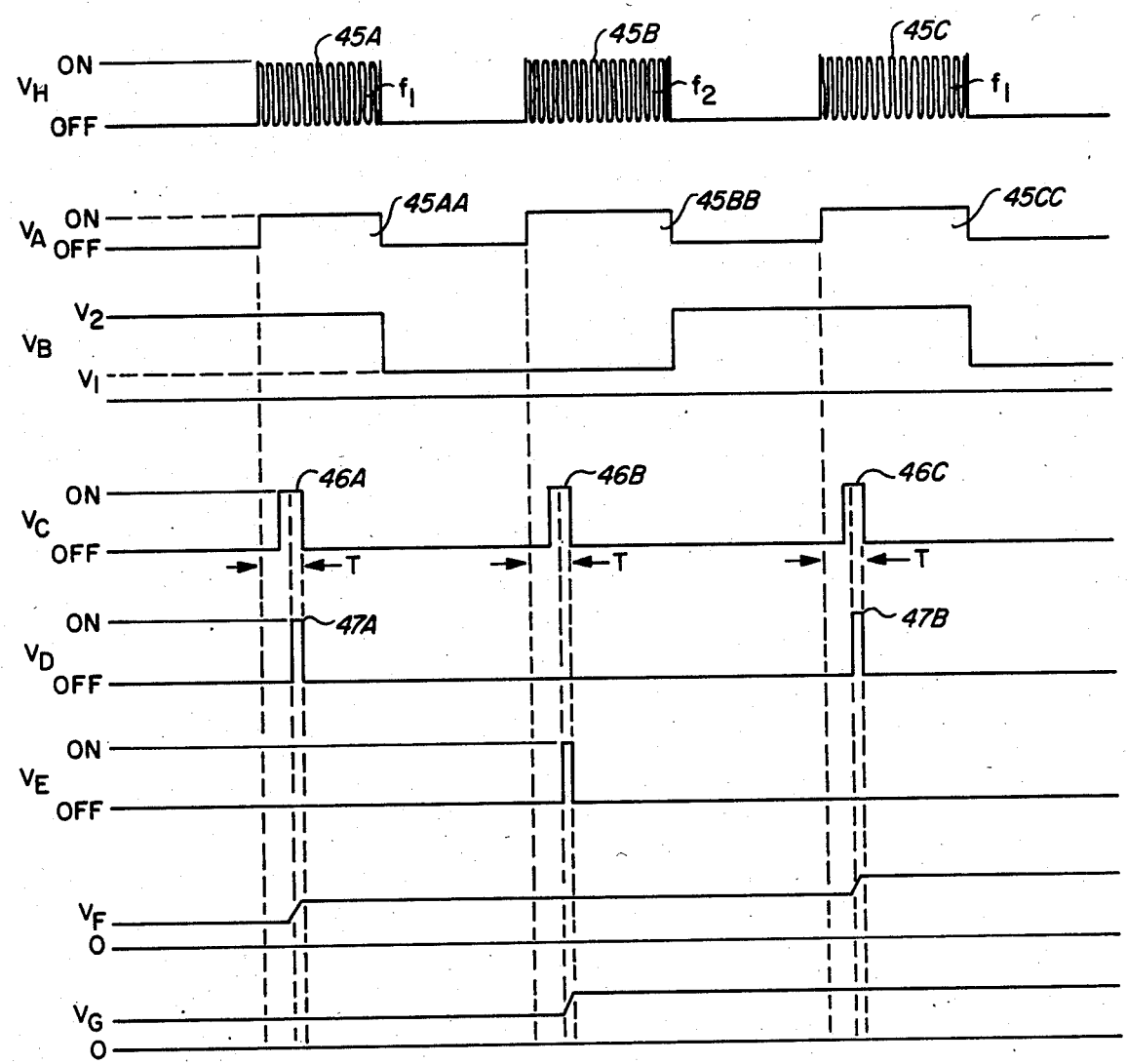
FIG. 2 is a diagram showing a number of waveforms useful in explaining the operation of the system shown in FIG. 1.

The circuitry shown in FIG. 1 as a block diagram is shown in more detail in FIGS. 3A-3D, but before referring to those figures, it may be helpful to understand first the basic operation of transceiver 10 with reference to the signals shown in FIG. 2. Referring now to FIG. 2, the waveform for the voltage $V_H$ on conductor 18 includes "pulses" or "bursts" such as 45A, 45B, and 45C that represent the actual microwave signals, having frequencies $f_1$ and $f_2$, that are produced by transmitter 11 on conductor 18 and radiated by antenna 19. The square waveform $V_A$ represents the "envelope" of the two pulses or burst of frequencies $f_1$ and $f_2$, respectively, being transmitted on conductor 18 to antenna 19. The voltage $V_A$ is the amplitude modulating voltage that appears on conductor 12A, and the pulses 45A, 45B and 45C alternately modulate the frequency of the bursts or pulses of the microwave signal $V_H$ between the frequencies $f_1$ and $f_2$.

The waveform $V_B$ in FIG. 2 designates the "frequency modulation" waveform produced on conductor 14 by circuitry 13A to control the oscillator frequency of microwave transmitter 11 so that the microwave carrier signal $V_H$ produced on conductor 18 by transmitter 11 has the frequency $f_1$ when $V_B$ has the voltage level $V_2$ and has the frequency $f_2$ when $V_B$ has the level $V_1$ indicated in the $V_B$ waveform. The voltage $V_B$ is applied to a varactor (which is common in some microwave transmitters) which controls the frequency of transmitter 11.

Still referring to FIG. 2, the $V_C$ waveform shows the "sampling" pulses 46A, 46B, 46C, etc. applied to the electrodes of the switching field effect transistor 24. The distance T indicates the "sampling range". In other words, no return signal from the target is measured after the duration of the period T for each burst of either $f_1$ or $f_2$ frequency microwave carrier signals transmitted by transmitter 11. Thus, targets further from antenna 19 than roughly several hundred feet (a value selected by means of switches 15A and 15B) are eliminated because reflected signals having a greater return time are not "gated" to the input of amplifier 25 in FIG. 1 and, therefore are eliminated.

Waveform $V_D$ in FIG. 2 shows very narrow pulses 47A and 47B which are used to turn the field effect transistor (FET) 28 on during the trailing portions of alternate sampling pulses 46A and 46C in order to gate amplified doppler signals from the $f_2$ microwave signal bursts (from the output of amplifier 25) onto sample/hold capacitor 30A. Similarly, for amplified doppler signals from the $f_1$ bursts, waveform $V_E$ shows that FET 29 is turned on for a short period at the trailing end of each of the alternate sampling pulses (such as 46B) to gate the output of amplifier 25 onto sample/hold capacitor 30B. It should be understood that the voltages on conductor 25A represent a doppler signal having a frequency $f_{1d}$ during the pulses 46A and 46C of the waveform $V_C$ and the signal on conductor 25A during the $V_C$ pulses such as 46B represent a second doppler signal having a frequency $f_{2d}$. The above sample/hold technique effectively reconstructs these two doppler frequency signals on sample/hold capacitors 30A and 30B, respectively.

It can be easily shown that the difference in phase of the two waveforms $V_F$ and $V_G$ is proportional to the difference in phase between the two doppler frequency signals $f_{1d}$ and $f_{2d}$ and that this phase difference is given by the equation:

$$\Delta\phi = (4\pi \Delta f R_0)/c$$

wherein $\Delta\phi$ is the phase difference between the two doppler signals $f_{1d}$ and $f_{2d}$, $\Delta f$ is the difference frequency between the two transmitter frequencies, i.e., $f_1 - f_2$, $R_0$ is the range of the target, i.e., its distance from antenna 19, and c is the speed of light.

Thus, it can be seen that the phase difference for "close-in" targets, such as rain on the surface of the radome surrounding antenna 19, is zero or very nearly zero, since the range $R_0$ is extremely small. Hence, the operation of the above-described circuit accomplishes the desired result of eliminating reflection signals due to the above-mentioned small, "close in" targets which have caused false alarms in prior microwave area intrusion systems.

The switches 15A and 15B of FIG. 1 are ganged together, as indicated by dotted line 83, and are adjustable and allow the range cutoff, (i.e., the range beyond which return signals are rejected by JFET 24) to be adjusted, and also allow the sensitivity of the system to small, close-in targets to be adjusted by adjusting $\Delta f$, and hence $\Delta\phi$.

Now that the basic structure of the block diagram and the waveforms of FIG. 2 have been described, the progress of the transmitted microwave frequencies $f_1$ and $f_2$ through the above circuitry will be described.

The transmitted microwave energy, of course, is transmitted from antenna 19 at the speed of light and is reflected from a target having the range $R_0$. The reflected energy returns at the speed of light, is detected by the antenna 19, and is mixed with a portion of the transmitter frequency in detector 21. Those skilled in the art know the output of any detector such as detector 21 is a voltage which is proportional to the phase difference between the transmitted signal and the reflected return signal. This phase difference, which varies proportionally to the velocity of the reflecting target, results in the doppler frequency $f_{1d}$ during the $f_1$ bursts and results in the doppler frequency $f_{2d}$ during the $f_2$ bursts.

In accordance with the present invention, the frequencies $f_1$ and $f_2$ and the rate of switching between these frequencies is such that no spurious RFI (radio frequency interference) signals are generated which exceed FCC regulation limits for commercial microwave volumetric intrusion detection systems.

The voltage output produced by detector 21 is amplified by DC amplifier 22, and is again amplified in AC amplifier 23, both of which are wideband amplifiers that are required to ensure that rapid changes in the output voltage of detector 21 can be faithfully reproduced. The output of AC amplifier 23 then is switched onto the input of AC amplifier 25 during the duration of the pulses of waveform $V_C$ in FIG. 2. Any doppler frequency voltages which are not gated by FET switch 24 through to amplifier 25 occur as a result of signals reflected from targets beyond the preselected range set by switches 15A and 15B.

Next, the output of amplifier 25 is switched into one of the "channels" consisting of conductor 30 and sample/hold capacitor 30A or conductor 31 and sample/- hold capacitor 30B. The width of the pulses of waveform $V_D$ and $V_E$ which sample the doppler frequencies $f_{1d}$ and $f_{2d}$ produced at the output of amplifier 25 are simply great enough to properly charge the two sample and hold capacitors 30A and 30B. Using this technique, the sampled information for each of the two "channels" is preserved until the next sample period, for that channel and thereby and increases the amount of energy available for processing in the following stages of the circuit of FIG. 1. In essence, then, two doppler signals $f_{1d}$ and $f_{2d}$ are reconstructed on conductors 30 and 31. Therefore, differential amplifier 33 produces a difference signal at its output conductor representative of $\Delta \phi$ given above. It is in this circuit that the elimination or rejection of doppler signals produced by small, "close in" targets is accomplished, since $\Delta \phi$ is very nearly zero in this case, and therefore the output of differential amplifier 33 is very low for such small "close in" targets.

The output of differential amplifier 33 is then amplified by AC amplifier 34. The sensitivity or gain of amplifier 34 is adjusted by variable resistor 35, and the output of amplifier 34 is coupled to a threshold circuit 35. This circuit produces an output pulse if the signal on conductor 34A exceeds a preset threshold, wherein the signals above that threshold are considered to indicate the beginning of a possible alarm condition.

A preselected number of these threshold crossing signals are required to be sure that the alarm condition continues for a predetermined time before the alarm 39 is turned on. Integrating circuit 37, in effect, counts the number of output pulses produced by threshold circuit 35 and actuates the alarm relay hold circuit 38 if that number is exceeded.

It should be noted that if an intruder attempts to deactivate transceiver 19 by slowly placing a metal cover over a radome 19, a very large DC output will be produced on conductor 21A by detector 21 due to reflections from the inside surface of such cases. This signal will be amplified by amplifier 22, producing a very large signal on conductor 22A, which will again be amplified by amplifier 41, causing a large signal to be produced on conductor 40A by overload detector circuit 40. This will cause integrator circuit 37 to actuate alarm relay hold circuit 38.

FIGS. 3A-3D constitute a detailed circuit schematic diagram of all of the circuitry shown in the block diagram of FIG. 1 except transmitter 11 and detector 21, which are ordinary tuned cavity devices which are commercially available. Detector 21 simply consists of an ordinary section of wave guide which supports the feed element of antenna 19A and contains a detector diode (not shown) which can be DMB 4009-99 Schottky barrier detector diode manufactured by Alpha, Inc. The detector diode has a probe that extends into the center of the wave guide. Transmitter 11 is attached to a tuned cavity which is attached to the rear end of the same waveguide structure as detector 21, and includes an oscillator "substrate". which can be Model No. F0-1007BD manufactured by Mitsubishi Corporation. The frequency of the oscillator is controlled by a varactor, Model No. DVH 6731-13, manufactured by Alpha, Inc.

Figure 3D:
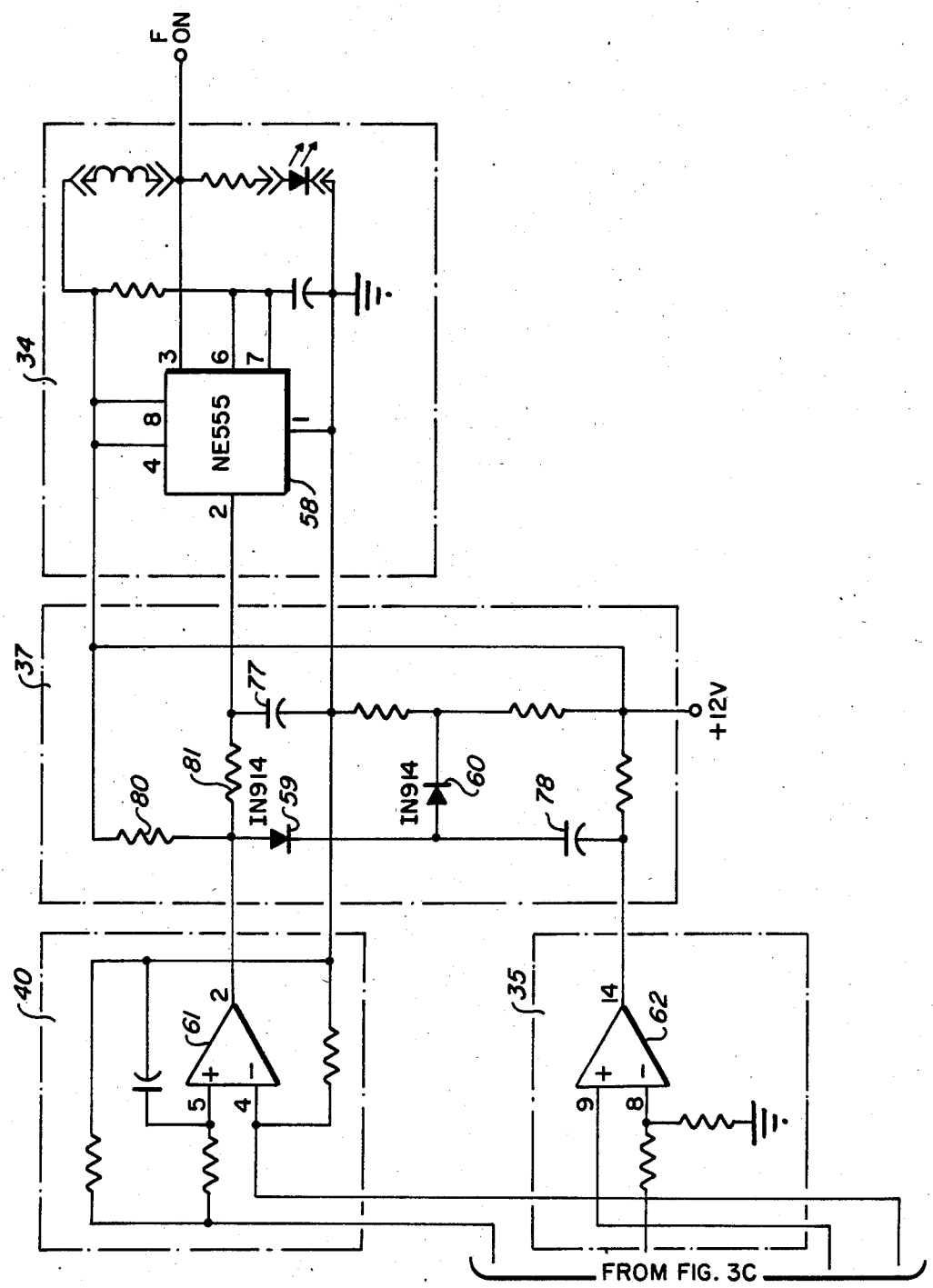

In FIGS. 3B-3D, dotted lines have been drawn around the various portions of the circuitry to identify the same circuitry represented by the blocks shown in FIG. 1; these dotted line blocks are identified by the same reference numerals that are used to designate the corresponding blocks in FIG. 1. The specific values of the various resistors and capacitors used as bias elements, pull up resistors, etc., have been omitted, as their values are simply a matter of design choice and can be readily provided by those skilled in the art. Although various different types of transistors can be used in the various applications shown in FIGS. 3A-3B, and various integrated circuit components other than those shown can also be readily provided by those skilled in the art, the transistor part numbers and integrated circuit part numbers are nevertheless given herein. Also, the lead numbers of the identified integrated circuits are shown on the diagrams of FIGS. 3A-3D.

In dotted line block 22 in FIG. 3A, which corresponds to DC amplifier 22 in FIG. 1, JFET 48 is implemented by means of a J310. In block 23, which corresponds to AC amplifier 23 in FIG. 1, JFET 49 also is a J310, and NPN transistor 50 is a 2N5770. Switch 24 of FIG. 1 is shown as a FET (field effect transistor) in FIG. 3A. This high speed switching field effect transistor is an SD5001, manufactured by Signetics. FET 26 is implemented also by means of an SD5001 field effect transistor. Field effect transistor 51 in block 25 (which discloses the circuitry for AC amplifier 25 of FIG. 1) is implemented by a J310 JFET, as is transistor 52.

Switch 28 in FIG. 1 is implemented by means of two series connected SD5001 FETs, as indicated by reference numeral 28 in FIG. 3. These two FETS are used instead of one simply to increase the isolation between AC amplifier 25 and differential amplifier 33 to approximately 40 db. Similarly, switch 29 of FIG. 1 is implemented by two SD5001 FETs connected in series and designated by reference numeral 29 in FIG. 3A.

In FIG. 3C, operational amplifiers 53A and 53B together constitute a buffer, (not shown in FIG. 1) and are implemented by means of Texas Instruments TL068 operational amplifiers.

In block 33 of FIG. 3C (which shows the circuitry of differential amplifier circuit 33 in FIG. 1), reference numeral 54 designates a Texas Instruments TL068 quad operational amplifier. In block 41 of FIG. 3C (which shows a detailed circuit for DC amplifier 41 of FIG. 1) reference numeral 55 designates a Texas Instruments TL098 operational amplifier. In block 34 in FIG. 3C (which designates AC amplifier 34 in FIG. 1) reference numerals 56 and 57 each designate a Texas Instruments TL094 operational amplifier. In FIG. 3D, block 58 in dotted line block 34 (which also designates part of AC amplifier 34 in FIG. 1) designates an NE555 integrated circuit timer/counter. In block 37, diodes 59 and 60 designate 1N914 diodes. In block 40, reference numeral 61 designates an LM339 operational amplifier. In block 35 of FIG. 3D, reference numeral 62 also designates an LM339 operational amplifier.

Returning to FIG. 3A, reference numeral 63 in block 15B designates a MC74HC138 integrated circuit programmable counter. AND gates 64A, 64B, 64C and 64D are contained in an MC74HC00 integrated circuit. Transistors 66 and 67 are 2N5771's. Transistor 68 is a 2N2369, and field effect transistor 70 is an SD5001.

In FIG. 3B, the circuits in block 13 designated by reference 71 and 72 are both implemented by means of MC74HC161 integrated circuits. (All of the integrated circuits with the prefix "MC" in their part number are manufactured by Motorola. The components with "LM" in their prefix are manufactured by National Semiconductor, Inc., and the components with "TL"

and their part number are manufactured by Texas Instruments.)

In FIG. 3B, NPN transistors 73 and 74 are 2N2369's, diode 75 is a 1N914, and field effect transistor 76 is an SD5001.

The FCC allocation for this type of system is centered at 10.525 GHz with a total bandwidth of 50 MHz. The difference frequency $\Delta f$ between $f_1$ and $f_2$, is selected in accordance with the range that is desired for the volumetric intrusion detection system 10.

The following table indicates different settings of switches 15A and 15B to produce the indicated range cutoff position, $\Delta f$, and bandwidth values.

TABLE 1

| Range cutoff position feet | $\Delta f$(MHz) | SAMPLE TIME AFTER TRANSMITTER IS TURNED "ON" (Nanoseconds) | RF SPECTRUM BW(MHz) at $-50$ dbc |
|---|---|---|---|
| 50 | 4.90 | 102 | 36.40 |
| 100 | 2.45 | 204 | 33.95 |
| 150 | 1.63 | 306 | 33.13 |
| 200 | 1.20 | 408 | 32.70 |

From the above table, it is clear how the $\Delta f = f_1 - f_2$ value and the value of the range $R_0$ determine the value $\Delta \phi$ and hence, the extent to which close-in target signals are rejected. Switch 15A sets the frequency spectrum $\Delta f$ and switch 15B sets the sampling time, i.e., the range.

The reason that the closer range cutoff positions ($R_o$) correspond to higher values of $\Delta f$ is that the system will have the same resolution, i.e., bandwidth, as for larger ranges.

FIG. 3A, it is clear that the signals 16A and 16B, which are driven by the gate and drain electrodes of field effect transistor 70, are logical complements, as mentioned above with reference to FIG. 1.

Although it is not necessary to describe in great detail the operation of all nodes and components in the detailed diagram of FIGS. 3A-3D to enable one skilled in the art to understand operation of the system, as the operation of the various integrated circuit components and the various field effect transistors and bi-polar transistors and the various amplifying circuits is straightforward, several comments will be made that will enable the reader to more rapidly appreciate certain aspects of the operation.

The buffer stage comprising blocks 53A and 53B in FIG. 3C disposed between FET switches 28 and 29 and the positive and negative inputs of differential amplifier 33 (FIG. 1) simply present a high input impedance to capacitors 30A and 30B to prevent leakage of the sampled voltage into the relatively low input impedance of differential amplifier 33. Those two buffer circuits 53A and 53B are essentially operational amplifier follower circuits.

In block 35 of FIG. 3D, the LM339 integrated circuit is a comparator. It is connected as a "single ended" threshold detector.

The diodes 59 and 60 and capacitor 77 and 78 in block 37 of FIG. 3D establish the number of pulses from the overload detector circuit 40 or the threshold detector circuit 35 are required before an alarm signal is triggered, and the NE555 timer/counter determines the duration of the resulting alarm signal once it is triggered. Capacitor 78 in FIG. 3D controls the amount of charge that is removed from into capacitor 77 via diode 59 each time an alarm "cross over" signal is generated by threshold detector circuit 35, and if enough such threshold crossovers occur from the output of differential amplifier 33, capacitor 77 becomes discharged to a low enough value to trigger the NE555 timer/counter 58, which is, in essence, connected to operate as a one-shot. Slow charge of capactor 77 occurs through resistor 80 and 81 to reset capacitor 77 after a target, transitory or otherwise, has disappeared. Thus, the circuit of block 37 in FIG. 3D functions as a pulse-counting integrator.

Capacitor 27 in FIG. 1 and FIG. 3A perform the functions, in conjunction with switching FET 26, of establishing a new steady reference for the input $V_C$ of AC amplifier 25 at the end of each sampling period. Note that the $V_D$ and $V_E$ waveforms in FIG. 2 shows that the sampling switches or FETs 28 and 29 sample the very end of each alternate pulse of the main sampling waveform $V_C$. When the signal 16B goes high, FET 26 is turned on and couples the capacitor 27 across resistor 80, coupling capacitor 81 and resistor 82. This sampled voltage is coupled thorugh amplifier 25 to FET switches 28 and 29. The amplified voltage is stored in either capacitor 30A or 30B depending upon the channel selected. The voltage on the capacitors is held until the following sampling period since many of these samples occur during one doppler cycle, the capacitors perform the function of a sample-hold circuit. Each sample is compared in differential amplifier 33. If both samples are "in phase" implying a close in target, the output of amplifier 33 is zero. If a phase difference between the two voltages exist, the output of amplifier 33 provides a DC voltage proportional to the phase difference, which corresponds to range of the target.

The above-described system thus produces very high reliability in detecting only desired intrusions into the protected region, and avoids setting off false alarms due either to small close-in targets or large, distant targets beyond the protected regions. The desirable result has been accomplished at reasonably low cost. More specifically, the above-described circuit rejects all microwave targets beyond a preselected range and therefore makes the system immune to false alarms from any object outside of the range cutoff distance, even very large microwave targets, such as semi-trailers, trees, trains or overhead doors. The above circuit also suppresses the amplitude of the reflection signal of any microwave target which is very close range. The circuit dramatically reduces nuisance alarms from rain, vibration, birds, and windblown objects. These features, however, do not effect detection of human intruders within the protective region.

While the invention has been described with reference to a particular embodiment thereof, those skilled in the art will be able to make various modifications to the described apparatus and method without departing from the true spirit and scope of the invention. It is intended that all equivalent intrusion detection systems which perform substantially the same work in substantially the same way to get substantially the same result be encompassed by the invention.

For example, it is not theoretically necessary that $V_H$ be in the form of pulses or bursts of the two frequencies $f_1$ and $f_2$. Although there are advantages to separating the "pulses" 45A, 45B, etc. of $V_A$, such as reduced power consumption and avoidance of cross-talk between the separate channels, it would be possible to have $V_A$ as a frequency modulated, continuous waveform with its frequency being alternately modulated from $f_1$ to $f_2$. Furthermore, additional frequencies could be used in the same way as $f_1$ and $f_2$ to avoid certain ambiguities, if necessary. And there is no fundamental reason why the sampling with FET 26 and the sampling with FETs 28 and 29 must be in separate stages, although our particular design is more economical and effective when implemented this way.

We claim:

1. A method of reliably detecting intruding targets in a protected region, said method comprising the steps of:
    (a) operating a transmitter to produce a microwave signal having successive, repetitive first and second portions of first and second frequencies, respectively, and radiating said microwave signal from an antenna into said protected region;
    (b) operating a receiver to detect a resulting return signal received by said antenna from a target to produce first and second doppler signals corresponding to said first and second frequency portions of said microwave signal, respectively;
    (c) operating the receiver to produce a gating signal and using the gating signal to gate said first and second doppler signals during first and second predetermined intervals onto first and second conductors, respectively, to reject any portion of said first and second doppler signals due to targets beyond a predetermined cutoff range;
    (d) subtracting one of said gated first and second doppler signals from the other to produce a suppressed doppler signal the amplitude of which is approximately proportional to the range of the reflecting target; and
    (e) producing an alarm signal in response to said suppressed doppler signal if said suppressed doppler signal exceeds a predetermined magnitude for at least a predetermined interval, to reject any portions of said first and second doppler signals which are due to small, close in targets such as rain on or vibration of a radome enclosing said antenna.

2. The method of claim 1 wherein said successive, repetitive first and second portions of said microwave signal include alternate, spaced pulses or bursts of said microwave signal.

3. The method of claim 2 wherein said pulses or bursts are present in said microwave signal for roughly a 50 percent duty cycle.

4. The method of claim 2 including the step of amplifying said first and second doppler signals, said first and second doppler signals having a phase difference corresponding to the difference between said first and second frequencies.

5. The method of claim 4 wherein said gating of step (c) includes switching said first and second doppler signals, in synchronization with said alternate pulses or bursts of said microwave signal, by means of a first high speed field effect transistor, into a first amplifier, and wherein said gating also includes switching the output of said first amplifier by means of second and third high speed field effect transistors onto said first and second conductors, respectively, in synchronization with trailing portions of said first and second intervals, respectively.

6. The method of claim 5 wherein step (d) includes storing the sampled output of said first amplifier on first and second capacitors connected to said first and second conductors, respectively, and further includes applying the voltages on said first and second conductors to the inputs of a differential amplifier to obtain a phase difference signal which represents the phase difference between said first and second doppler signals, respectively.

7. The method of claim 6 including amplifying said phase difference signal and applying it to a threshold detecting circuit.

8. The method of claim 7 including integrating the output of said threshold detecting circuit by means of an integrating circuit and producing said alarm signal if the output of said integrating circuit exceeds a predetermined level.

9. The method of claim 8 including amplifying said first and second doppler signals and producing said alarm signal if said first and/or second doppler signals exceed a predetermined level in order to ensure that said alarm signal is produced if a large, very close in target is placed in front of said antenna.

10. A system of reliably detecting intruding targets in a protected region, comprising in combination:
    (a) transmitter means for producing a microwave signal having successive, repetitive first and second portions of first and second frequencies, respectively, and radiating said microwave signal from an antenna into said protected region;
    (b) receiver means for detecting a resulting return signal received by said antenna from a target to produce first and second doppler signals corresponding to said first and second frequency portions of said microwave signal, respectively;
    (c) means in said receiver means for producing a gating signal and utilizing said gating signal to gate said first and second doppler signals during first and second predetermined intervals onto first and second conductors, respectively, to reject any portions of said first and second doppler signals due to targets beyond a predetermined cutoff range;
    (d) means in said receiver means for subtracting one of said first and second doppler signals from the other, to produce a suppressed doppler signal the amplitude of which is approximately proportional to the range of the reflecting target; and
    (e) means for producing an alarm signal in response to said suppressed doppler signal if said suppressed doppler signal exceeds a predetermined magnitude for at least a predetermined interval, to reject any portions of said first and second doppler signals which are due to small, close in targets such as rain on or vibration of a radome enclosing said antenna.

11. The system of claim 10 including modulating means for causing said successive, repetitive first and second portions of said microwave signal to include alternate, spaced pulses or bursts of said microwave signal.

12. The system of claim 11 wherein said modulating means produces said pulses or bursts in said microwave signal at roughly a 50 percent duty cycle.

13. The system of claim 11 including means for amplifying said first and second doppler signals, said first and second doppler signals having a phase difference corresponding to the difference between said first and second frequencies.

14. The system of claim 13 wherein said gating means includes means for switching said first and second doppler signals, in synchronizaton with said alternate pulses or bursts of said microwave signal, by a first high speed field effect transistor, into a first amplifier, and wherein said gating means also includes means for switching the output of said first amplifier by second and third high speed field effect transistors onto said first and second conductors, respectively, in synchronization with trailing portions of said first and second intervals, respectively.

15. The system of claim 14 wherein said phase difference determining means includes means for storing the sampled output of said firsrt amplifier as first and second capacitors connected to said first and second conductors, respectively, and further includes means for applying the voltages on said first and second conductors to the inputs of a differential amplifier to obtain a phase difference signal which represents the phase difference between said first and second doppler signals, respectively.

16. The system of claim 15 including means for amplifying said phase difference signal and applying it to a threshold detecting circuit.

17. The system of claim 16 including means for integrating the output of said threshold detecting circuit and producing said alarm signal if an output of said integrating means exceeds a predetermined level.

18. The system of claim 17 including means for amplifying said first and second doppler signals and producing said alarm signal if said first and/or second doppler signals exceed a predetermined level in order to ensure that said alarm signal is produced if a large, very close in target is placed in front of cover over said antenna.

19. The method of claim 1 wherein step (c) includes producing said gating signal during the first portion of each of said first and second portions of said microwave signal produced by the transmitter.

20. The method of claim 19 wherein the interval between the beginning of one of said first and second portions of said microwave signal and the end of a pulse of said gating signal corresponds to a value of said predetermined cutoff range between about 50 feet and a few hundred feet.

21. The method of claim 20 wherein said first and second portions of said microwave signal are of sufficient durations to prevent the bandwidth of side band emissions of the transmitter from exceeding approximately 50 MHz.

22. The system of claim 10 wherein said gating signal means produces said gating signal during the first portion of each of said first and second portions of said microwave signal produced by said transmitter means.

23. The system of claim 22 wherein said gating signal means produces said gating signal so that the interval between the beginning of one of said first and second portions of said microwave signal and the end of a pulse of said gating signal corresponds to a value of said predetermined cutoff range between about 50 feet and a few hundred feet.

24. The system of claim 23 wherein said transmitter means produces said first and second portions of said microwave signal of sufficient durations to prevent the bandwidth of side band emissions of said transmitter means from exceeding approximately 50 MHz.

* * * * *